US012761674B2

(12) United States Patent
Chiang

(10) Patent No.: US 12,761,674 B2
(45) Date of Patent: Oct. 13, 2026

(54) POWER TIMING CONTROL DEVICE AND METHOD

(71) Applicant: Delta Electronics, Inc., Taoyuan City (TW)

(72) Inventor: Po Sung Chiang, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 113 days.

(21) Appl. No.: 18/931,674

(22) Filed: Oct. 30, 2024

(65) Prior Publication Data

US 2026/0050306 A1 Feb. 19, 2026

(30) Foreign Application Priority Data

Aug. 13, 2024 (CN) ........................ 202411109314.5

(51) Int. Cl.
*G05F 1/46* (2006.01)
*G06F 1/26* (2006.01)
*G06F 1/30* (2006.01)

(52) U.S. Cl.
CPC ................ *G05F 1/465* (2013.01); *G05F 1/46* (2013.01); *G06F 1/26* (2013.01); *G06F 1/30* (2013.01)

(58) Field of Classification Search
CPC . G05F 1/46; G05F 1/462; G05F 1/465; G06F 1/26; G06F 1/28; G06F 1/30; G06F 1/305
See application file for complete search history.

(56) References Cited

U.S. PATENT DOCUMENTS

| | | | | |
|---|---|---|---|---|
| 7,788,515 B2* | 8/2010 | Wong | G06F 1/26 | 327/198 |
| 9,603,219 B2 | 3/2017 | Dai et al. | | |
| 2009/0158071 A1* | 6/2009 | Ooi | G06F 11/30 | 713/340 |
| 2012/0185720 A1* | 7/2012 | Kall | G06F 1/26 | 713/300 |
| 2016/0109933 A1* | 4/2016 | Damle | G06F 1/263 | 713/323 |
| 2017/0006688 A1 | 1/2017 | Dai et al. | | |
| 2022/0247314 A1* | 8/2022 | Zou | H02M 3/1584 | |
| 2025/0172987 A1* | 5/2025 | Hsu | G06F 1/3212 | |

FOREIGN PATENT DOCUMENTS

| | | |
|---|---|---|
| CN | 212112400 U | 12/2020 |
| TW | 202401206 A | 1/2024 |
| WO | 2020034775 A1 | 2/2020 |

* cited by examiner

*Primary Examiner* — Patrick O Neill
(74) *Attorney, Agent, or Firm* — The Roy Gross Law Firm, LLC; Roy D. Gross

(57) ABSTRACT

Power timing control devices and methods are disclosed. Each of one or more controlled chips is enabled based on a logical-AND-gated operation of primary and auxiliary enable signals to generate a control voltage based on a DC power voltage. In a signal timing sequence, a representative moment during the control voltage falling from high to low level occurs earlier than a moment when a level on a signal waveform of the DC power voltage falling from high to low level equals a minimum operation voltage level for the controlled chip. In this way, a power timing control operation can be performed under both light and heavy load conditions of a system, and a controller can be driven for powering up and off the system according to the control voltage, thereby effectively preventing the controller from abnormality or breakdown.

20 Claims, 11 Drawing Sheets

POWER TIMING CONTROL DEVICE AND METHOD

CROSS REFERENCE TO RELATED APPLICATIONS

The application claims the priority of China Patent Applications No. 202411109314.5, titled "POWER TIMING CONTROL DEVICE AND METHOD," filed on Aug. 13, 2024, the disclosure of which is incorporated herein by reference.

FIELD OF THE INVENTION

The present disclosure relates to the technical field of power timing control, specifically to power timing control devices and methods.

BACKGROUND OF THE INVENTION

Electronic devices usually use a controller (MCU) to control internal operating status. However, a light or heavy load will affect a power signal waveform for the controller. As a result, the controller may breakdown or become abnormal when power is heavily loaded. Although there have been some power control technologies in the prior art, they still need to be improved.

SUMMARY OF THE INVENTION

An object of the present disclosure aims to provide power timing control devices and methods to effectively prevent a controller from abnormality or breakdown when power is heavily loaded.

To achieve the above object, an aspect of the present disclosure provides a power timing control device, including a power conversion unit configured to generate a DC power voltage; a primary chip configured to generate at least one primary enable signal based on the DC power voltage; one or more auxiliary chips, wherein each of the one or more auxiliary chips is configured to generate an auxiliary enable signal based on the DC power voltage; and one or more controlled chips, wherein each of the one or more controlled chips is coupled to the power conversion unit, a respective one of the one or more auxiliary chips, and the primary chip, and is configured to be enabled based on a logical-AND-gated operation of the primary enable signal and the auxiliary enable signal to generate a control voltage based on the DC power voltage; wherein in a signal timing sequence, a representative moment during the control voltage falling from high to low level occurs earlier than a moment when a level on a signal waveform of the DC power voltage falling from high to low level equals a minimum operation voltage level for the controlled chip.

To achieve the above object, another aspect of the present disclosure provides a power timing control device, including a power conversion unit configured to generate a DC power voltage; a primary chip configured to generate at least one primary enable signal based on the DC power voltage; and one or more controlled chips, wherein each of the one or more controlled chips is coupled to the power conversion unit and the primary chip, and internally includes an auxiliary circuit configured to generate an auxiliary enable signal based on the DC power voltage; and a controlled circuit configured to be enabled based on a logical-AND-gated operation of the primary enable signal and the auxiliary enable signal to generate a control voltage based on the DC power voltage; wherein in a signal timing sequence, a representative moment during the control voltage falling from high to low level occurs earlier than a moment when a level on a signal waveform of the DC power voltage falling from high to low level equals a minimum operation voltage level for the controlled chip To achieve the above object, another aspect of the present disclosure provides a power timing control method applied to a circuit that includes a power conversion unit, a primary chip, one or more auxiliary chips, and one or more controlled chips, wherein each of the one or more controlled chips is coupled to the power conversion unit, a respective one of the one or more auxiliary chips, and the primary chip, and the method includes enabling the power conversion unit to generate a DC power voltage; enabling the primary chip to generate at least one primary enable signal based on the DC power voltage; enabling each of the one or more auxiliary chips to generate an auxiliary enable signal based on the DC power voltage; and controlling each of the one or more controlled chips to be enabled based on a logical-AND-gated operation of the primary enable signal and the auxiliary enable signal to generate a control voltage based on the DC power voltage; wherein in a signal timing sequence, a representative moment during the control voltage falling from high to low level occurs earlier than a moment when a level on a signal waveform of the DC power voltage falling from high to low level equals a minimum operation voltage level for the controlled chip.

In the power timing control devices and methods of the present disclosure, each of one or more controlled chips is enabled based on the logical-AND-gated operation of the primary enable signal and the auxiliary enable signal to generate the control voltage based on the DC power voltage. In the signal timing sequence, the representative moment during the control voltage falling from high to low level occurs earlier than the moment when the level on a signal waveform of the DC power voltage falling from high to low level equals a minimum operation voltage level for the controlled chip. Thus, a power timing control operation is allowed under light or heavy load conditions. Especially under heavy load, interventions are provided in time before the power drops to the minimum operation voltage for the controlled chip, causing the voltage associated with the controller to change to a power-down level, which can effectively prevent the controller from abnormality or breakdown.

THE DETAILED DESCRIPTION OF PREFERRED EMBODIMENTS

To make the above and other objects, features, and advantages of the present disclosure more apparent and understandable, preferred embodiments of the present disclosure will be described in detail below, along with the accompanying drawings.

In a system, the power provided for a controller (MCU) must perform voltage timing control operations according to specifications for powering up and down to prevent the controller from abnormality or failure due to excessive heat or electrical stress. For example, the power-up requirement of the controller is to provide voltages such as 1.1 volts (V), 1.8 volts, and 3.3 volts in sequence, but not limited to the description here, to send signals to step up to a specified voltage in stages to power up the system. The power-down requirement of the controller is to provide voltages such as 3.3 volts, 1.8 volts, and 1.1 volts in sequence, but not limited to the description here, to send signals to step down to another specified voltage to power down the system.

Figure 1:
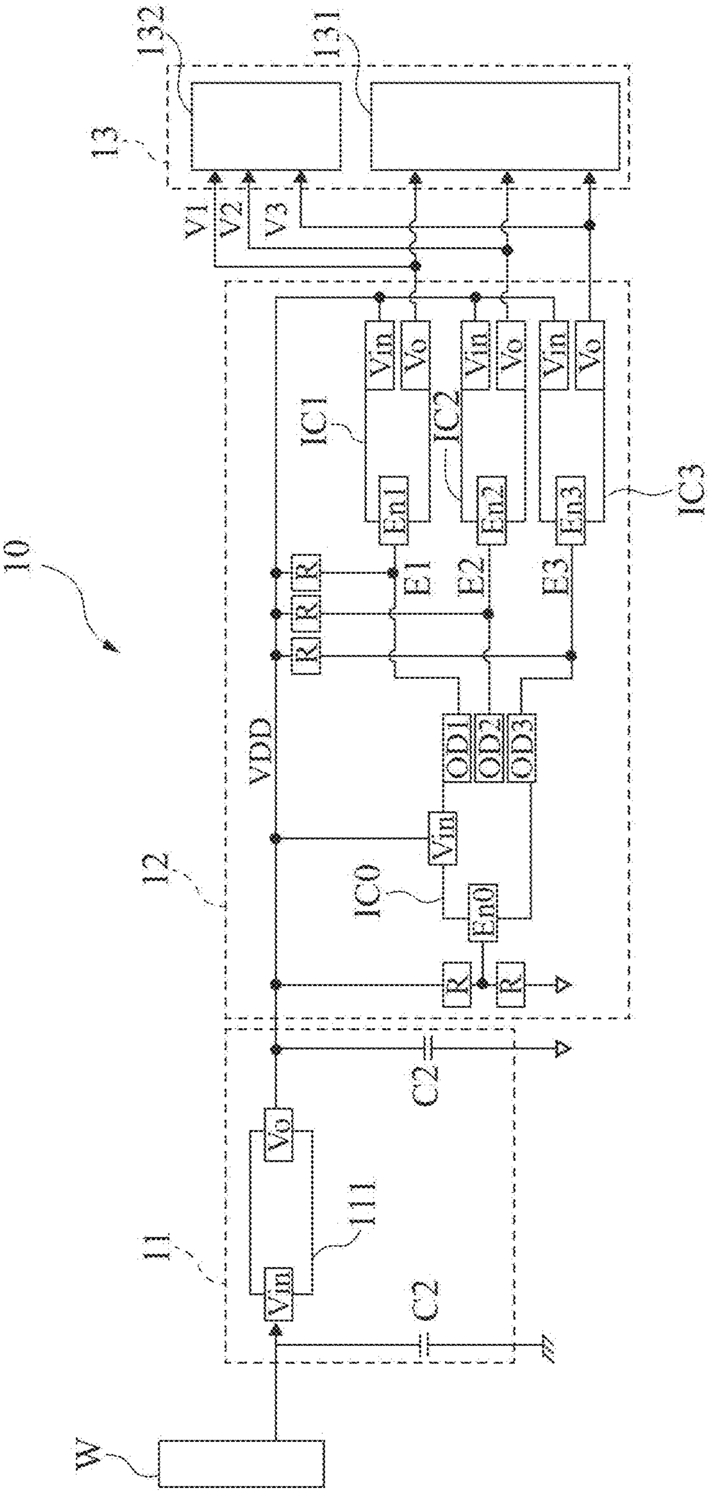
FIG. 1 is a schematic diagram illustrating a circuit associated with a power timing control device provided in an embodiment of the present disclosure.

For example, as shown in FIG. 1, a circuit example 10 includes a power supply part 11, an electric control part 12, and a power consumption part 13. The electric control part 12 is electrically connected to the power supply part 11 and the power consumption part 13. For example, the power supply part 11 generates power (such as DC power) VDD. For example, the power supply part 11 includes a DC converter (i.e., a power conversion unit, such as a Flyback DC/DC converter) 111, in which an input terminal Vin and an output terminal Vo of the DC converter 111 are connected to the ground through capacitors C1 and C2, respectively, to convert the DC power from a power supply system W to the power VDD. For example, after the system is powered up or before the system is powered down, a voltage is controlled and adjusted to rise and fall to reach a predetermined level associated with the power VDD.

As shown in FIG. 1, the electric control unit 12 generates voltages V1, V2, and V3 (only three control voltages are taken as an example herein, but not limited to the description here) according to the power VDD. For example, the electric control unit 12 includes a chip in a first type (e.g., serving as a primary chip) IC0 and three chips in a second type (e.g., serving as controlled chips) IC1, IC2, and IC3. An input terminal Vin of the chip IC0 and an input terminal Vin of each of the chips IC1, IC2, and IC3 input the power VDD that can also form an enabling voltage through a voltage divider (e.g., two resistors R connected in series) to be transmitted to an enable terminal En0 of the chip IC0, such that three output terminals of the chip IC0 (such as drain output terminals) output signals OD1, OD2, and OD3, respectively.

As shown in FIG. 1, enable terminals En1, En2, and En3 of the chips IC1, IC2, and IC3 are respectively connected to the corresponding three output terminals of the chip IC0 and connected to the output terminal Vo of the DC converter 111 via a resistor R. Based on a voltage associated with the power VDD, the signals OD1, OD2, and OD3 output by the three output terminals of the chip IC0 collaboratively generate three signals E1, E2, and E3, such that respective three output terminals Vo of the three chips IC1, IC2, and IC3 generate three voltages V1, V2, and V3, respectively. The power consumption part 13 is driven by the voltages V1, V2, and V3 to run specific functions. For example, the power consumption part 13 includes a controller 131 and a peripheral circuit 132. The controller 131 inputs the voltages V1, V2, and V3 to generate control signals to power up a system, such as a data processing or storage system, but not limited to the description here.

Figure 2:
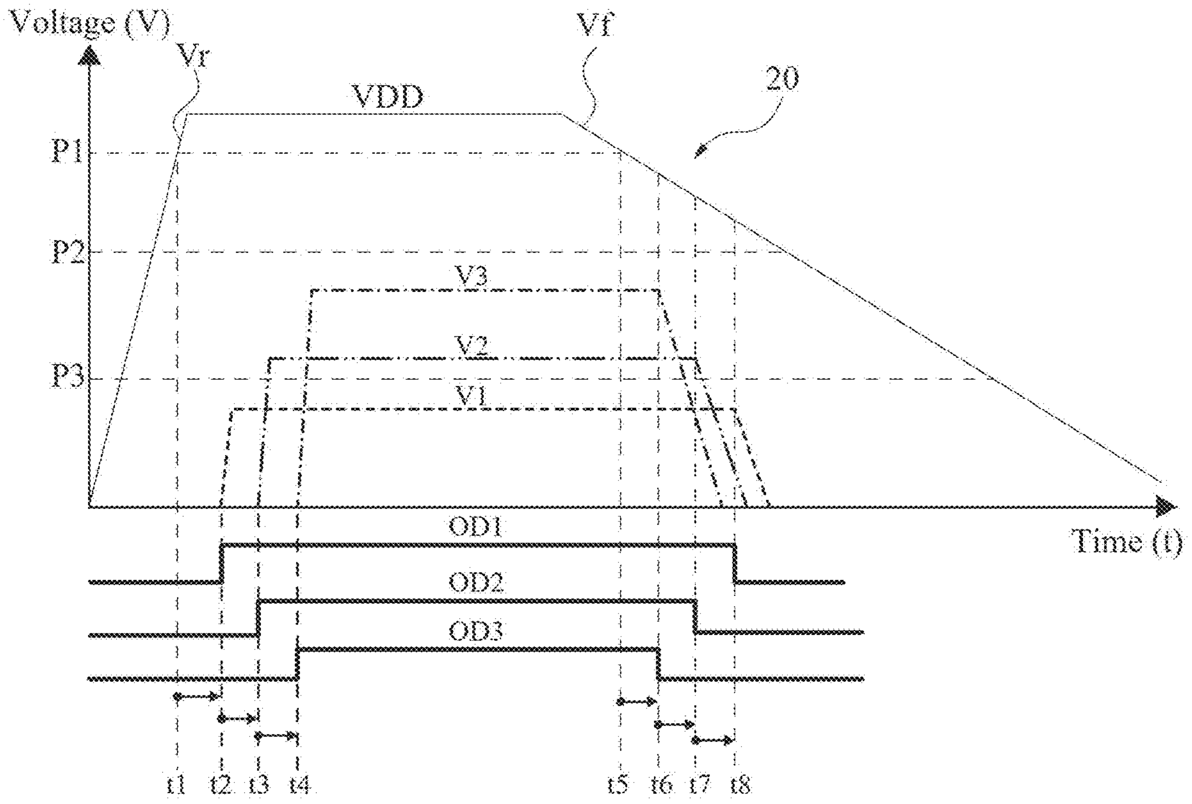
FIG. 2 is a schematic diagram illustrating a signal waveform for the circuit shown in FIG. 1 in a light-load state.

As shown in FIG. 1, the power supply part 11 can be configured to generate the power VDD with an appropriate voltage (e.g., 5V). FIG. 2 shows a signal waveform example 20 of a system in a light-load state, including the power VDD forming a rising edge Vr and a falling edge Vf during the power-up and power-down phases. The rising edge Vr rises from a low level (such as 0V) to a high level (such as 5V) during the rising period. The falling edge Vf falls from the high level to the low level during the falling period. There are three levels, P1, P2, and P3, from high to low, between the low and the high levels. The first level P1 is a system power up-and-down voltage setting level. The second level P2 is a minimum operation voltage level for the three chips IC1, IC2, and IC3. The third level P3 is a minimum operation voltage level for the chip IC0. It should be understood that in FIG. 2, the relative change relationship between signals at different levels is mainly presented for the convenience of explanation. Leveled voltage values are not necessarily accurately scaled and drawn in accurate proportions. The specific voltage value can be understood by those ordinarily skilled in the art to which the present disclosure belongs.

In an aspect, as shown in FIGS. 1 and 2, in the case that the system is in the light-load state, the slope of the falling edge Vf of the power VDD is lower (i.e., the falling edge Vf takes a longer time to fall from high to low level). In addition, the voltages V1, V2, and V3 are only provided to controller 131 during operations. Chips IC0, IC1, IC2, and IC3 can be configured appropriately to have specific control logic and packaging pins. For example, chip IC0 has a first control logic circuit, and each of the three chips IC1, IC2, and IC3 has a second logic circuit, such that the voltages V1, V2, and V3 of the circuit example 10 are set to power-up levels (such as 1.1, 1.8 or 3.3V, applicable to the high level for powering up the controller) and set to a power-down level (such as 0V) before the power VDD falls to the level P2.

For example, as shown in FIGS. 1 and 2, during the rising edge Vr of the power VDD (such as the voltage signal waveform), after the chip IC0 detects the moment t1 when the power VDD rises from a low level (such as 0V) to the level P1, an appropriate time can be used for delaying to sequentially generate signals OD1, OD2, and OD3 with enable levels (such as 1.5V, serving as a high level) to control the enable terminals En1, En2, and En3 of the three chips IC1, IC2, and IC3. For example, at moments t2, t3, and t4, the signals OD1, OD2, and OD3 are sequentially changed from the disable level (such as 0V, serving as a low level) to the enable level to control the three chips IC1, IC2, and IC3 to perform enabling operations sequentially, such that the three chips IC1, IC2, and IC3 sequentially output voltages V1, V2, and V3 with power-up levels. For example, the voltage V1 rises from 0V to 1.1V, the voltage V2 rises from 0V to 1.8V, and the voltage V3 rises from 0V to 3.3V. After the controller 131 receives the three voltages V1, V2, and V3 in sequence, it can send out relevant signals to officially power up the system.

As shown in FIGS. 1 and 2, during the falling edge Vf of the power VDD (such as a voltage signal waveform), the chip IC0 can delay appropriate time after detecting the moment t5 when the power VDD drops from the high level to the level P1, then generate enable signals with disable levels in sequence to transmit them to enable terminals En3, En2, and En1 of the three chips IC3, IC2, and IC1, respectively. For example, at moments t6, t7, and t8, the signals OD3, OD2, and OD1 are sequentially changed from an enable level to a disable level to sequentially control the three chips IC3, IC2, and IC1 to perform a disabled operation, causing the three chips IC3, IC2, and IC1 to sequentially output three voltages V3, V2, and V1 with power-down levels. For example, a voltage V3 drops from 3.3V to 0V, a voltage V2 drops from 1.8V to 0V, and a voltage V1 drops from 1.1V to 0V. After the controller 131 sequentially receives the three voltages V3, V2, and V1, it can send relevant signals to officially power down the system.

Figure 3:
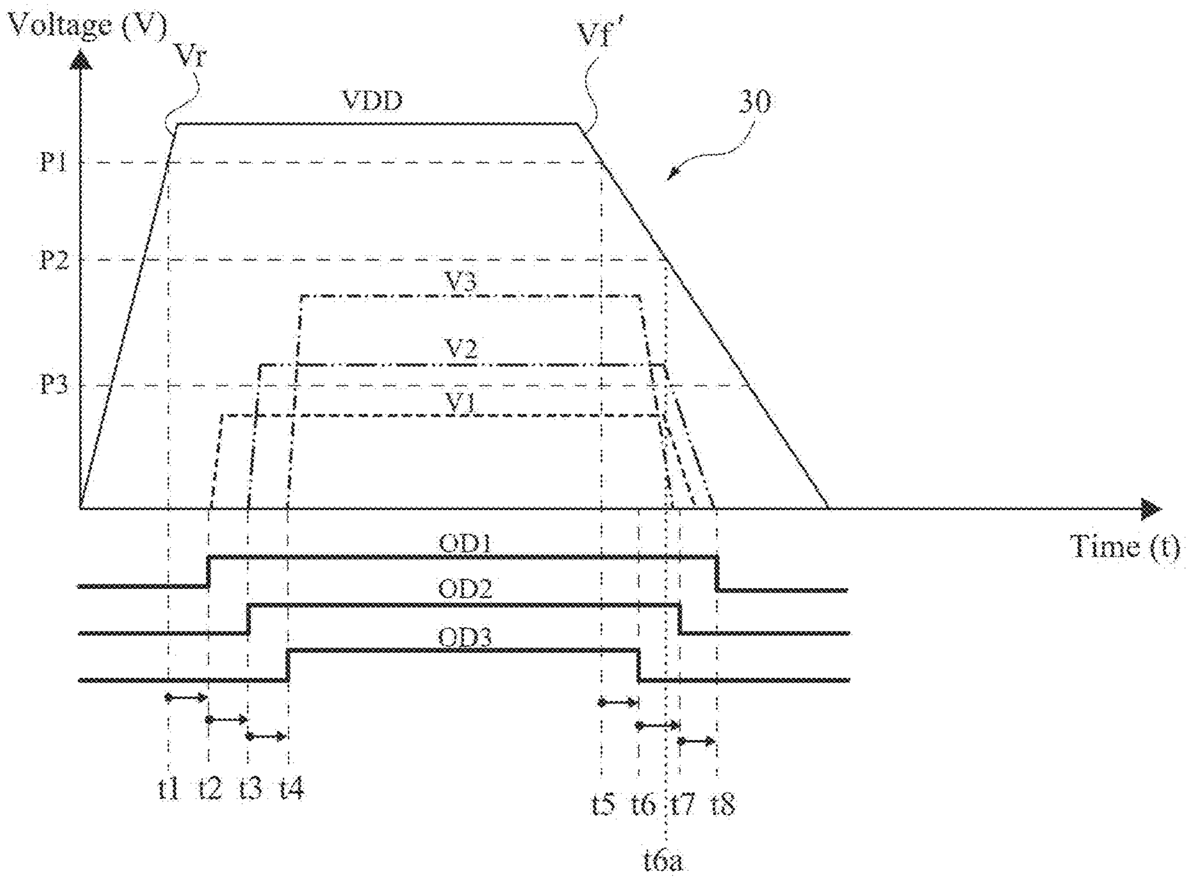
FIG. 3 is a schematic diagram illustrating a signal waveform for the circuit shown in FIG. 1 in a heavy-load state.

In another aspect, as shown in FIGS. 1 and 3, in the case that the system load is in a heavy-load state, FIG. 3 shows a signal waveform example 30 of the system in a heavy-load state, including the slope of the falling edge Vf' of the power VDD higher than the slope of the falling edge Vf shown in FIG. 2 (i.e., the falling edge Vf' takes a shorter time to fall from high to low level). In addition, the voltages V1, V2, and V3 are provided to the controller 131 and the peripheral circuit 132 during operations. The chips IC0, IC1, IC2, and IC3 can be appropriately configured to have control logic. For example, the chip IC0 has a first control logic circuit, and the three chips IC1, IC2, and IC3 have a second logic circuit, respectively.

Figure 4A:
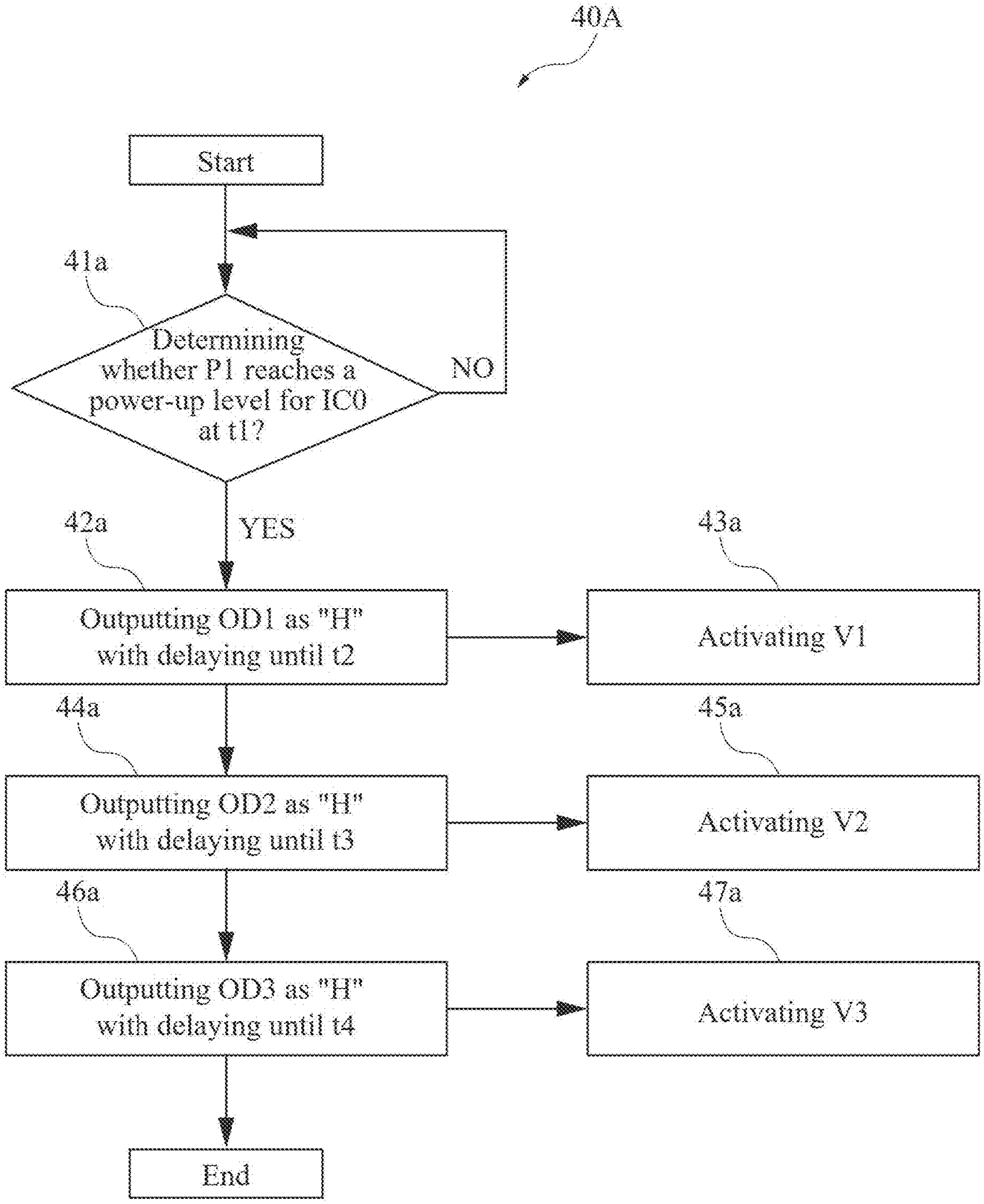
FIGS. 4A and 4B are schematic diagrams illustrating flowcharts for controlling the circuit shown in FIG. 1 in the heavy-load state for powering up and off.

As shown in FIGS. 1 and 3, during the rising edge Vr of the power VDD (such as the voltage signal waveform), as shown in FIG. 4A, in a control flowchart example 40A, in response to the chip IC0 detecting that the power VDD rises from the low level to the level P1, proceed to step 41*a*. In step 41*a*, at a moment t1, it is determined whether the level P1 reaches the power-up level of the chip IC0; if the determination is negative (NO), repeat step 41*a* to confirm whether the power VDD reaches the power-up level of the chip IC0; if the determination is positive (YES), proceed to step 42*a*. In step 42*a*, at a moment t2, the signal OD1 is changed from the disable level to the enable level (marked as "H"), then proceed to steps 43*a* and 44*a*. In step 43*a*, the chip IC1 outputs the voltage V1 with the enable level, wherein the voltage V1 rises from 0V to 1.1V. In step 44*a*, at a moment t3, the signal OD2 is changed from the disable level to the enable level (marked as "H"), then proceed to steps 45*a* and 46*a*. In step 45*a*, the chip IC2 outputs the voltage V2 with the power-up level, wherein the voltage V2 rises from 0V to 1.8V. In step 46*a*, at a moment t4, the signal OD3 is changed from the disable level to the enable level (marked as "H"), and proceed to step 47*a*. In step 47*a*, the chip IC3 outputs a voltage V3 with the power-up level, and the voltage V3 rises from 0V to 3.3V. After the controller 131 receives the voltages V1, V2, and V3 in sequence, it can send a signal to officially power up the system.

Figure 4B:
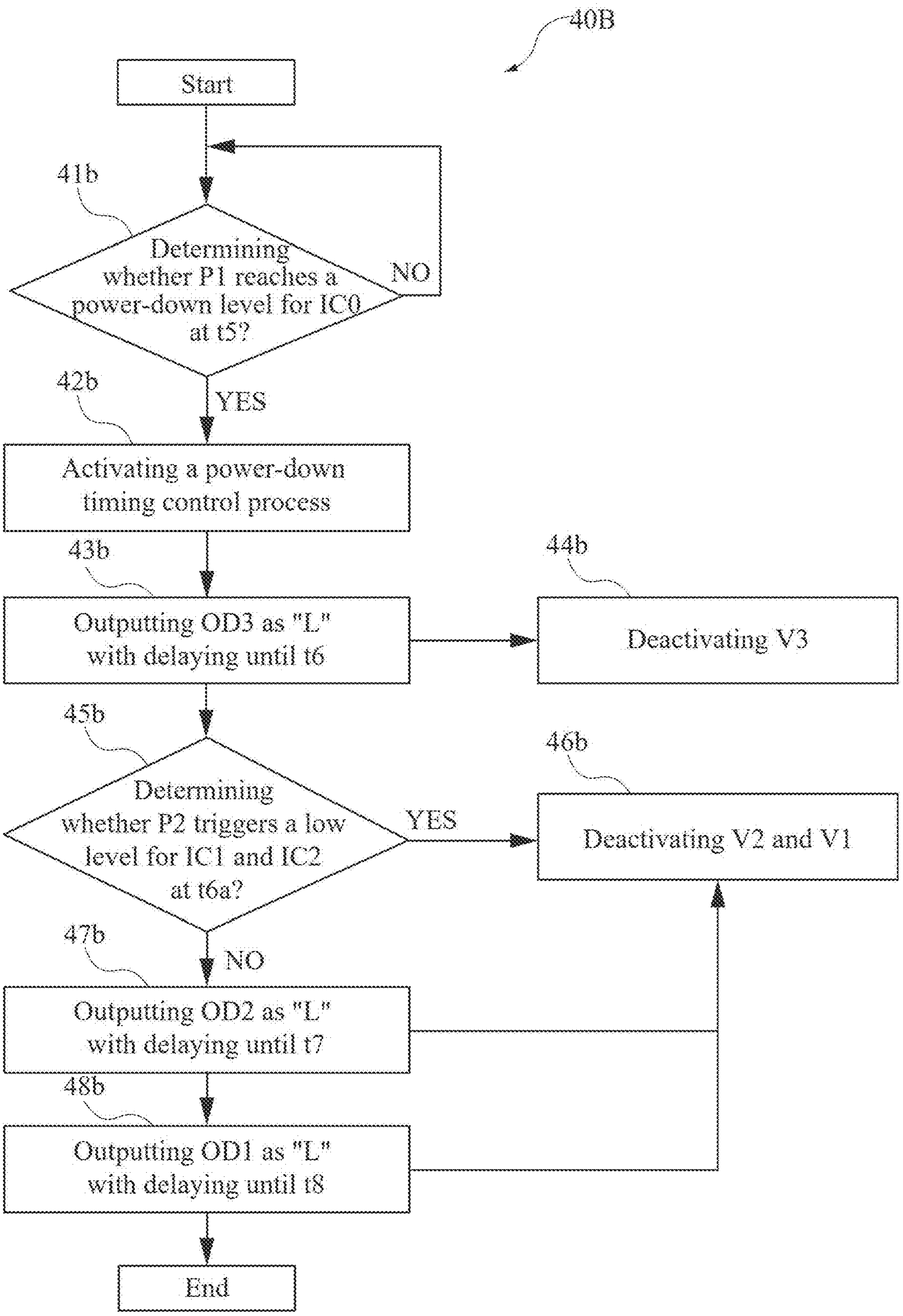

As shown in FIGS. 1 and 3, during the falling edge Vf' of the power VDD (such as the voltage signal waveform), as shown in FIG. 4B, in a control flowchart example 40B, in response to the chip IC0 detecting that the power VDD drops from the high level to the level P1, proceed to step 41*b*. In step 41*b*, at a moment t5, it is determined whether the level P1 reaches the power-down level of the chip IC0; if the determination is negative (NO), repeat step 41*b* to confirm that the power VDD reaches the power-down level of the chip IC0; if the determination is positive (YES), proceed to step 42*b*. In step 42*b*, a power-down timing control process is activated, then proceed to step 43*b*. In step 43*b*, at a moment t6, the signal OD3 is changed from the enable level to the disable level (marked as "L"), then proceed to steps 44*b* and 45*b*. In step 44*b*, the chip IC3 outputs a voltage V3 with the power-down level, wherein the voltage V3 drops from 3.3V to 0V.

It should be noted that, as shown in FIGS. 1 and 2, in the case of the circuit example 10 under the light-load condition, the system is officially powered down after the controller 131 receives the voltages V3, V2, and V1 in sequence. However, as shown in FIGS. 1 and 3, in the case of the circuit example 10 under the heavy-load condition, the voltage on the falling edge Vf' of the power VDD drops rapidly because of excessive peripheral load. It is possible that before the chips IC3, IC2, and IC1 did not output the voltages V3, V2, and V1 with the power-down level in time, the voltage of the power VDD was already lower than the minimum operation voltage level of the chips IC1, IC2, and IC3, causing each of the chips IC1, IC2, and, IC3 stops in operation. As a result, the voltages V3, V2, and V1 with power-down levels cannot usually be output to power down the system.

For example, as shown in FIGS. 1 and 3, if the voltage of the power VDD has fallen to the level P2 at a moment t6*a* before moments t7 and t8, then after the moment t6*a*, the voltage of the power VDD is lower than the level of the minimum operation voltage of the chips IC2 and IC3, such that the chips IC2 and IC3 cannot operate normally, causing the controller 131 to breakdown or power down abnormally.

As shown in FIGS. 1 and 3, in response to detecting that the voltage of the power VDD is lower than the level of the minimum operation voltage of the chips IC2 and IC3, to prevent the system from being unable to power down, it is necessary to force the voltages V1 and V2 to the power-down level in time. For example, as shown in FIGS. 1, 3, and 4B, in the control flow example 40B, in step 45*b*, at a moment t6*a*, it is determined whether the level P2 triggers the low level of the chips IC1 and IC2 (i.e., the level of the minimum operation voltage); if the determination is positive (YES), the voltages V1 and V2 must be forced to change to the power down level and proceed to step 46*b*; in step 46*b*, the chips IC1 and IC2 output the voltages V1 and V2 with the power-down levels, wherein the voltage V2 drops from 1.8V to 0V, and the voltage V1 drops from 1.1V to 0V; if the determination is negative (NO), proceed to steps 47*b* and 48*b* in sequence. In steps 47*b* and 48*b*, the signals OD2 and OD1 are respectively changed from the enable level to the disable level (marked as "L") at moments t7 and t8, then proceed to step 46*b*. In step 46*b*, the chips IC1 and IC2 output voltages V1 and V2 with the power-down levels, wherein the voltage V2 drops from 1.8V to 0V, and the voltage V1 drops from 1.1V to 0V.

Because the voltage signal waveform of the power will be affected by the load, for example, when a power supply is turned off, the slope of the power signal waveform will be different depending on the light load and heavy load conditions. If the power timing is not adequately controlled in response to the load condition, it may cause the controller to breakdown or become abnormal when the power is reloaded. It may further cause data corruption in a storage device.

Herein, it should be noted that to overcome the above situations, the following power timing control schemes are also provided, which can consider the system hold-up time and heavy and light load conditions for power-down timing control operations. Especially under heavy load, before the power drops to the minimum operation voltage for the controlled chip, the voltage associated with the controller is changed to the power-down level in time to prevent the controller from abnormality or breakdown. Examples are given below but are not limited to the description here.

Figure 5:
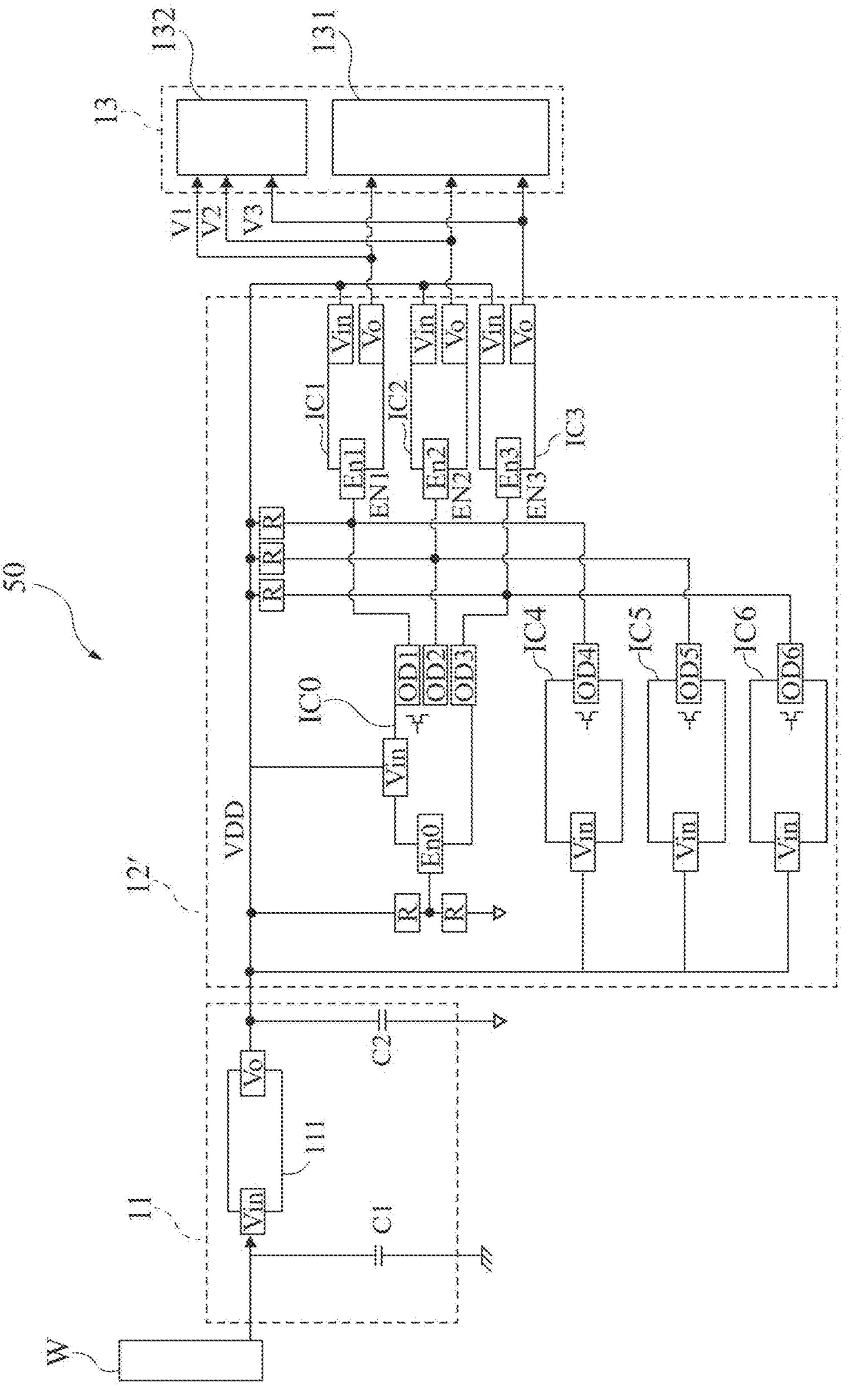
FIG. 5 is a schematic diagram illustrating a circuit of a first embodiment of the power timing control device provided in the present disclosure.
Figure 6:
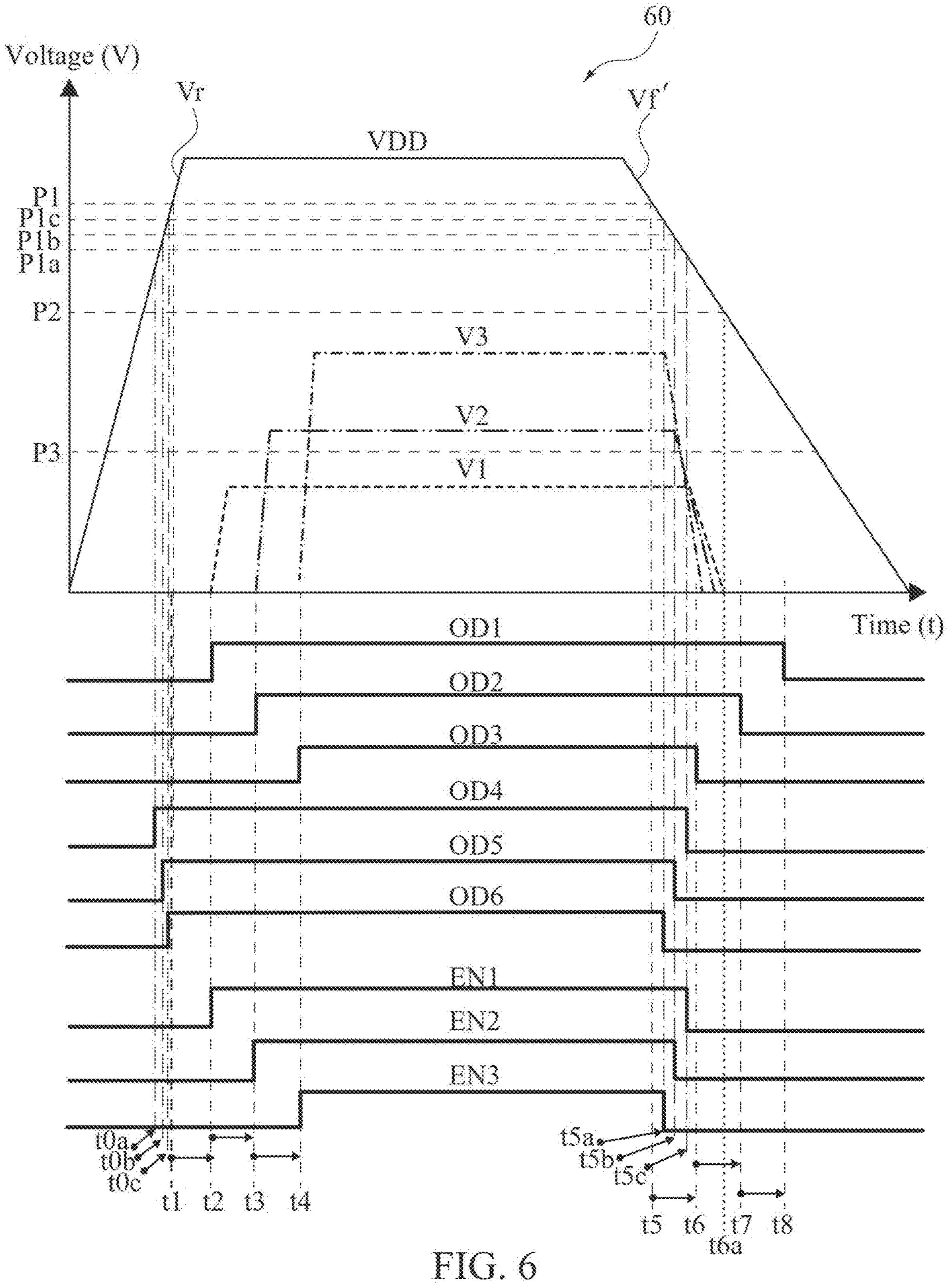
FIG. 6 is a schematic diagram illustrating a signal waveform for the circuit shown in FIG. 5 in a heavy-load state.

In an aspect, as shown in FIGS. 5 and 6, the present disclosure provides a power timing control device including a power supply part 11, e.g., a DC converter (i.e., a power conversion unit, such as a Flyback DC/DC converter) 111, in which an input terminal Vin and an output terminal Vo of the DC converter 111 are connected to the ground through the capacitors C1 and C2, respectively, to convert a DC power from a power supply system W into a DC power voltage (such as VDD). The power timing control device includes a primary chip (such as IC0) which is configured to generate at least one primary enable signal (such as OD1, OD2, and/or OD3) according to the DC power voltage (such as VDD). The power timing control device includes one or more auxiliary chips (such as IC4, IC5, and/or IC6), wherein each of the one or more auxiliary chips is configured to generate auxiliary enable signals (such as OD4, OD5, and/or OD6) based on the DC power voltage VDD, respectively. The power timing control device includes one or more controlled chips (such as IC1, IC2 and/or IC3), wherein each of the one or more controlled chips is coupled to a respective one of the one or more auxiliary chips and the primary chip. Each of the one or more controlled chips is configured to be enabled based on a logical-AND-gated operation of the primary enable signal and the auxiliary enable signal to generate control voltages (such as V1, V2 and/or V3) based on the DC power voltage VDD. In a signal timing sequence, a representative moment during the control voltage falling from a high level to a low level occurs earlier than a moment (e.g., t6*a*) when a level on a signal waveform of the DC power voltage falling from high to low level equals a minimum operation voltage level (e.g., P2) for the controlled chip to facilitate in powering down the system normally. In the signal timing sequence, a representative moment during the control voltage rising from the low level to the high level occurs later than a moment (e.g., t1) when a level on a signal waveform of the DC power voltage rising from low to high level equals a system power up-and-down voltage setting level (e.g., P1) to facilitate in powering up of the system normally. In the present disclosure, each of the DC power voltage, the primary enable signal, the auxiliary enable signal, and the control voltage has bistable levels (H/L), respectively.

In this example, a representative moment during the control voltage falling from high to low level can be any level of the control voltage during falling from high to low level (for example, but not limited to a power-up level, a median level, or a power-down level). For example, a value of the median level is an intermediate value between the power-up level (i.e., a high level) and the power-down level (i.e., a low level) or an average value of the power-up and power-down levels.

For example, a first embodiment uses external chips to perform a precise timing control process. As shown in FIG. 5, a circuit example 50 includes a power supply part 11, an electric control part 12', and a power consumption part 13. The electric control part 12' is electrically connected to the power supply part 11 and the power consumption part 13. The power supply part 11 and the power consumption part 13 of the circuit example 50 are substantially the same as the power supply part 11 and the power consumption part 13 of the circuit example 10 shown in FIG. 1. For example, the power supply part 11 includes a DC converter (such as a Flyback DC/DC converter) 111. The remaining parts are not described again. The difference between the circuit example 10 and the circuit example 50 is that the electric control part 12' of circuit example 50 differs from the electric control part 12 of circuit example 10.

As shown in FIG. 5, the electric control part 12' of the circuit example 50 includes a chip in a first type (e.g., serving as the primary chip) IC0, three chips in a second type (e.g., serving as the controlled chips) IC1, IC2, and IC3, and three chips in a third type (e.g., serving as the auxiliary chips) IC4, IC5, and IC6. An input terminal Vin of chip IC0, three input terminals Vin of the chips IC1, IC2, and IC3, and three input terminals Vin of the chips IC4, IC5, and IC6 input a power VDD. The power VDD provides a DC power voltage. The power VDD can also form an enable voltage through a voltage divider (e.g., two resistors R connected in series) and transmit it to the enable terminal En0 of the chip IC0, such that three output terminals (such as drain output terminals) of the chip IC0 output signals OD1, OD2, and OD3 (i.e., the primary enable signals), respectively. Three output terminals of the three chips IC4, IC5, and IC6 output signals OD4, OD5, and OD6 (i.e., the auxiliary enable signals). Based on the voltage associated with the power VDD, the signals OD1, OD2, and OD3 output by the three output terminals of the chip IC0 and the signals OD4, OD5, and OD6 output by the three chips IC4, IC5, and IC6 collaboratively generate three signals to enable terminals En1, En2, and En3 of the chips IC1, IC1, and IC3.

For example, as shown in FIG. 5, the signals OD1 and OD4 are configured as a logical-AND-gated operation to generate the signal EN1. Namely, if either of the signals OD1 and OD4 is logic "0" (or a low level), then the signal EN1 is logic "0" (or a low level); if each of the signals OD1 and OD4 is logic "1" (or a high level), then the signal EN1 is logic "1" (or a high level). Similarly, the signals OD2 and OD5 are configured as a logical-AND-gated operation to generate the signal EN2, and the signals OD3 and OD6 are configured as a logical-AND-gated operation to generate the signal EN3. The operation logic will not be described again. For example, the enable terminals En1, En2, and En3 of the chips IC1, IC2, and IC3 are respectively connected to the three output terminals of the chip IC0, respective three output terminals of the three chips IC4, IC5, and IC6 to be connected to the output terminal of the DC converter 111 via a resistor R but not limited to the description here. Alternatively, the three output terminals of the chip IC0 and the three output terminals of the three chips IC4, IC5, and IC6 can also use AND-gate logic elements to generate the logical-AND-gated operations for the respective enable terminals En1, En2, and En3 of the chips IC1, IC2, and IC3. In this way, the signal EN1 is used to drive the chip IC1 to generate the voltage V1 at the output terminal Vo, the signal EN2 is used to drive the chip IC2 to generate the voltage V2 at the output terminal Vo, and the signal EN3 is used to drive the chip IC3 to generate the voltage V3 at the output terminal Vo.

As shown in FIG. 5, the power supply part 11 generates the power VDD with an appropriate voltage (e.g., 5V). FIG. 6 shows a signal waveform example 60 of the system in a heavy-load state, including the power VDD forming a rising edge Vr and a falling edge Vf' during the power-up and power-down phases. The rising edge Vr rises from low to high level during the rising period. The falling edge Vf' falls from high to low level during the falling period. There are three levels P1, P2, and P3, from high to low, between the low and the high levels. The first level P1 is a system power up-and-down voltage setting level. The second level P2 is a minimum operation voltage level for the three chips IC1, IC2, and IC3. The third level P3 is a minimum operation voltage level for the chip IC0. There are three intermediate levels P1*a*, P1*b*, and P1*c*, from low to high, between the levels P1 and P2. It should be understood that in FIG. 6, the relative change relationship between signals at different levels is mainly presented for the convenience of explanation. Leveled voltage values are not necessarily accurately scaled and drawn in accurate proportions. The specific voltage value can be understood by those ordinarily skilled in the art to which the present disclosure belongs.

In the case that the system is light-loaded, as shown in FIGS. 1 and 5, after the voltages V1, V2, and V3 of the circuit example 50 the same as the voltages V1, V2, and V3 of the circuit example 10, based on the power VDD, rise from the low level to the level for minimum operation voltage (shown as P2 in FIGS. 2 and 6) of the three chips IC1, IC2, and IC3, change to the power-up level and then change to the power-down level before the power VDD falls from the high level to the level for minimum operation voltage to make that the controller 131 operates normally.

As shown in FIGS. 5 and 6, in the case that the system is heavy-loaded, voltages V1, V2, and V3 are provided to the controller 131 and the peripheral circuit 132. Chips IC0, IC1, IC2, IC3, IC4, IC5, and IC6 can be appropriately configured to have control logic, as illustrated below.

Figure 7A:
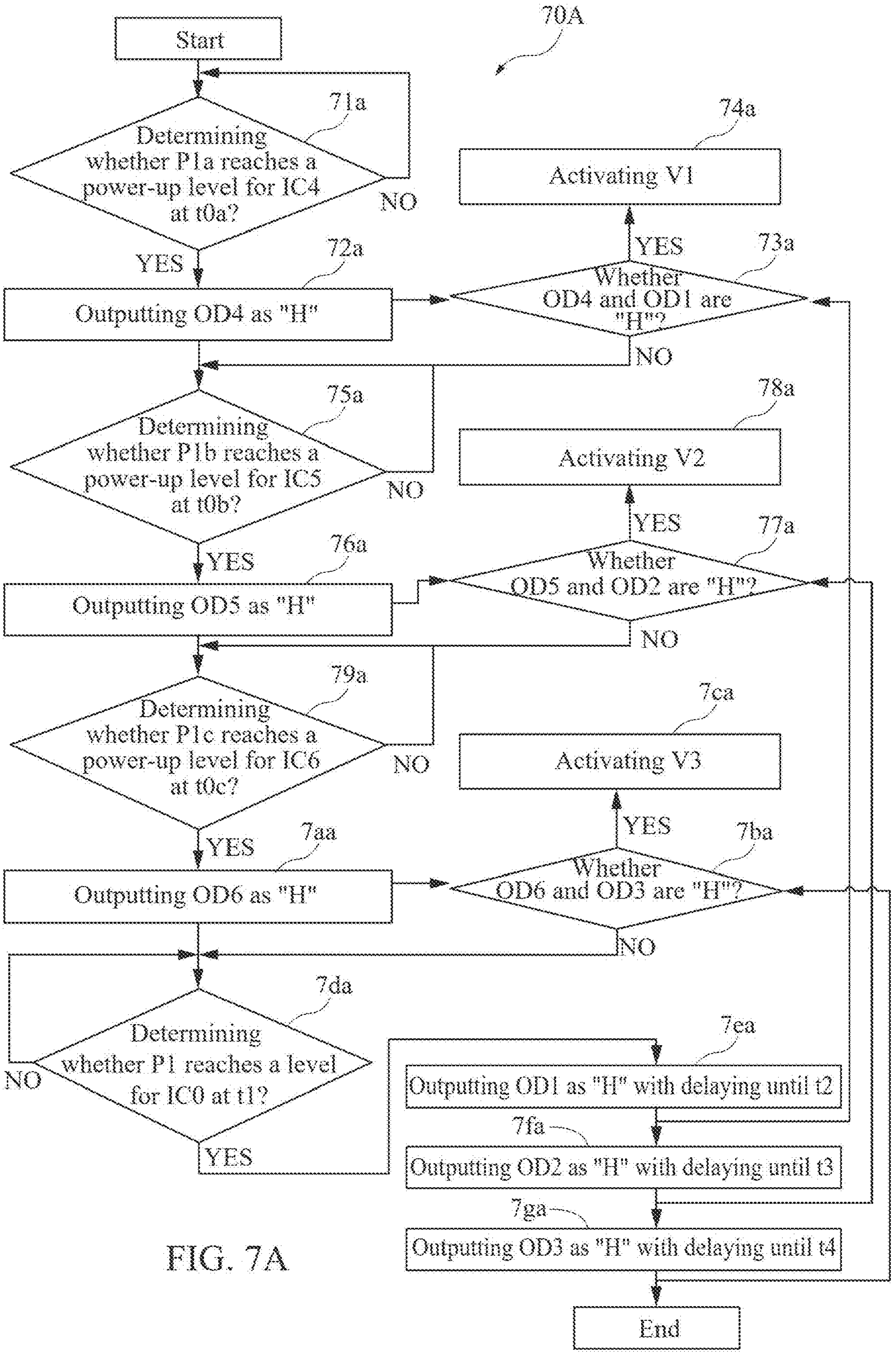
FIGS. 7A and 7B are schematic diagrams illustrating flowcharts for controlling the circuit shown in FIG. 5 in the heavy-load state for powering up and off.

In an aspect, as shown in FIGS. 5 and 6, during the rising edge Vr of the power VDD (such as the voltage signal waveform), at a moment t1, when the chip IC0 detects that the power VDD rises from the low level to the level P1, an appropriate time can be used for delaying to sequentially generate signals OD1, OD2, and OD3 with enable levels (such as a high level) are generated in sequence. As shown in FIG. 7A, in a control flowchart example 70A, in response to the chip IC0 detecting that the power VDD rises from the low level, proceed to step 71*a*. In step 71*a*, at a moment t0*a*, it is determined whether the level P1*a* reaches the power-up level of the chip IC4; if the determination is negative (NO), repeat step 71*a* to confirm that the power VDD reaches the power-up level of the chip IC4; if the determination is positive (YES), proceed to step 72*a*. In step 72*a*, the signal OD4 is changed from the disable level to the enable level (marked as "H"), and proceed to steps 73*a* and 75*a*. In step 73*a*, at a moment t2, it is determined whether the signals OD4 and OD1 are at the enable level (marked as "H"); if the determination is positive (YES), the signal EN1 is set to the enable level, and proceed to step 74*a*; in step 74*a*, the chip IC1 outputs the voltage V1 with the enable level, wherein the voltage V1 rises from 0V to 1.1V; if the determination is negative (NO), proceed to step 75*a*. In step 75*a*, at a moment t0*b*, it is determined whether the level P1*b* reaches the power-up level of the chip IC5; if the determination is negative (NO), repeat step 75*a* to confirm that the power VDD reaches the power-up level of the chip IC5; if the determination is positive (YES), proceed to step 76*a*. In step 76*a*, the signal OD5 is changed from the disable level to the enable level (marked as "H"), and then proceed to steps 77*a* and 79*a*. In step 77*a*, at a moment t3, it is determined whether the signals OD5 and OD2 are at the enable level (marked as "H"); if the determination is positive (YES), the signal EN2 is set to the enable level, and proceed to step 78*a*; in step 78*a*, the chip IC2 outputs the voltage V2 with the enable level, wherein the voltage V2 rises from 0V to 1.8V; if the determination is negative (NO), proceed to step 79*a* to confirm that the power VDD reaches the power-up of the chip IC6. In step 79*a*, at a moment t0*c*, it is determined whether the level P1*c* reaches the power-up level of the chip IC6; if the determination is negative (NO), repeat step 79*a* to confirm that the power VDD reaches the power-up level of the chip IC6; if the determination is positive (YES), proceed to step 7*aa*. In step 7*aa*, the signal OD6 is changed from the disable level to the enable level (marked as "H"), and then proceed to steps 7*ba* and 7*da*. In step 7*ba*, at a moment t4, it is determined whether the signals OD6 and OD3 are at the enable level (marked as "H"); if the determination is positive (YES), the signal EN3 is set to the enable level, and then proceed to step 7*ca*; in step 7*ca*, the chip IC3 outputs the voltage V3 with the power-up level, wherein the voltage V3 rises from 0V to 3.3V; if the determination is negative (NO), proceed to step 7*da*. In step 7*da*, at a moment t1, it is determined whether the level P1 reaches the power-up level of the chip IC0; if the determination is negative (NO), repeat step 7*da* to confirm that the power VDD reaches the power-up level of the chip IC0; if the determination is positive (YES), proceed to step 7*ea*. In step 7*ea*, it is delayed until moment t2 reaches to output the signal OD1 with the enable level (marked as "H"), then proceed to steps 73*a* and 7*fa*. In step 7*fa*, it is delayed until moment t3 reaches to output the signal OD2 with the enable level (marked as "H"), then proceed to steps 77*a* and 7*ga*. In step 7*ga*, it is delayed until moment t4 reaches to output the signal OD3 with the enable level (marked as "H"), then proceed to step 7*ba*.

In this way, regardless of the system in the light-load or heavy-load state, during the rising edge Vr of the power, the moments introduced between the level of the minimum operation voltage (i.e., P2) of the controlled chips (i.e., IC1, IC2, and IC3) and the level of the system power up-down voltage (i.e., P1) is used to more accurately generate the enable signals (i.e., EN1, EN2, and EN3) of the controlled chip (i.e. IC1, IC2, and IC3) to correctly generate voltages V1, V2, and V3 in sequence to the controller 131 to send signals to actually power up and power down the system.

Figure 7B:
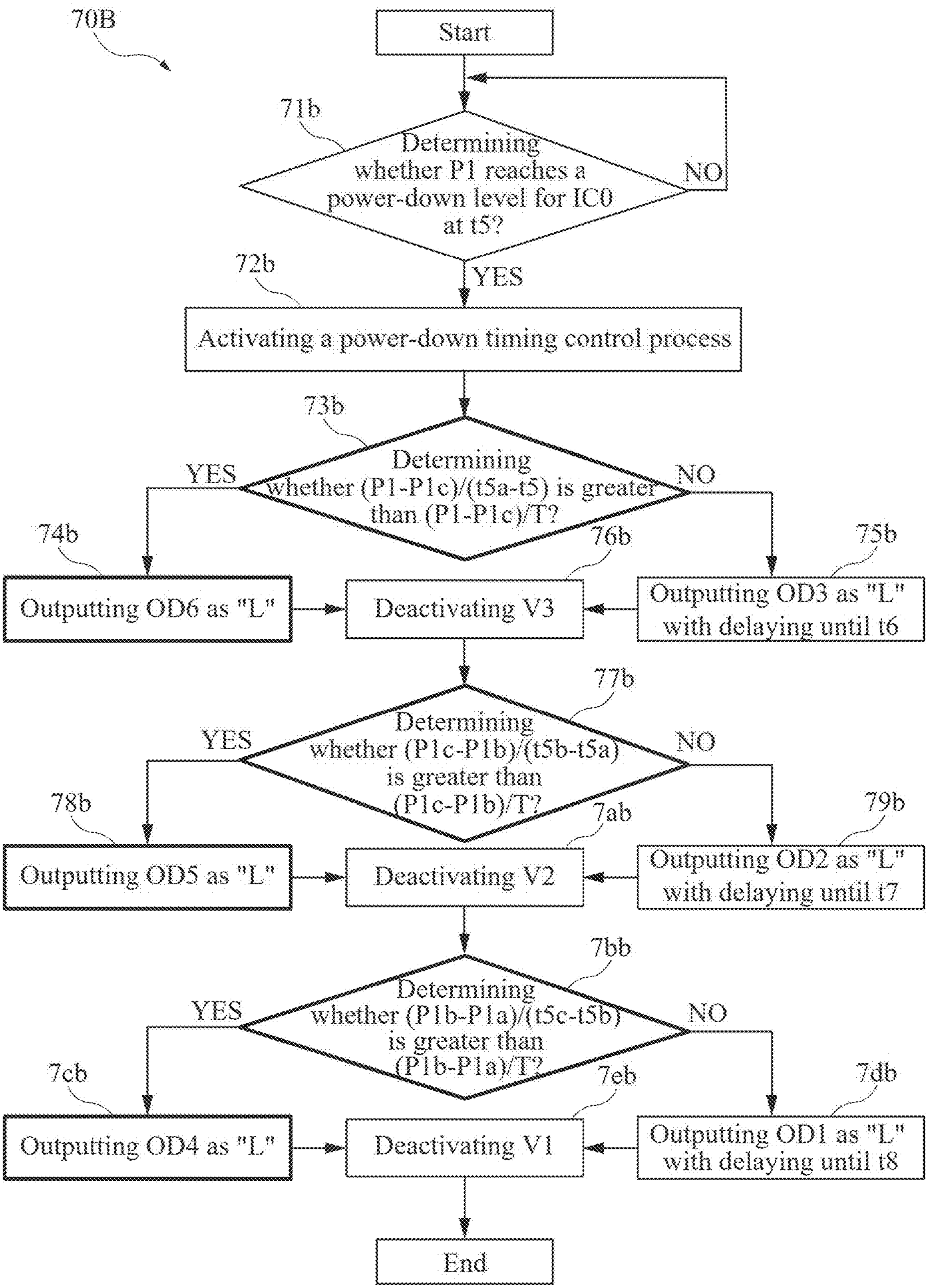

In another aspect, as shown in FIGS. 5 and 6, during the falling edge Vf' of the power VDD (such as the voltage signal waveform), as shown in FIG. 7B, in a control flowchart example 70B, in response to the chip IC0 detecting that the power VDD falls from the high level to the level P1, proceed to step 71*b*. In step 71*b*, at a moment t5, it is determined whether the level P1 reaches the power-down level of the chip IC0; if the determination is negative (NO), repeat step 71*b* to confirm that the power VDD reaches the power-down level of the chip IC0; if the determination is positive (YES), proceed to step 72*b*. In step 72*b*, a power-down timing control process is activated, and then proceed to step 73*b*. In step 73*b*, it is determined whether the slope of the falling edge Vf' of the power VDD is too large, e.g., it is determined that a ratio of (a difference calculated by subtracting the level P1*c* from the level P1) divided by (a difference between moments t5*a* and t5) is greater than a ratio of (a difference calculated by subtracting the level P1*c* from the level P1) divided by a value T; e.g., the value T is equal to a difference between the moments t6 and t5, a difference between moments t7 and t6, or a difference between moments t8 and t7; if the determination is positive (YES), it means that the voltage of the power VDD drops rapidly, and proceed to step 74*b*; if the determination is negative (NO), it means The voltage of the power VDD drops slowly, and proceed to step 75*b*. In step 74*b*, the signal OD6 is changed from the enable level to the disable level (marked as "L"), and then proceed to step 76*b*. In step 76*b*, the chip IC3 outputs the voltage V3 with a power-down level, wherein the voltage V3 falls from 3.3V to 0V. In step 75*b*, it is delayed until moment t6 reaches to output the signal OD3 with the disable level (marked as "L"), and then proceed to step 76*b*. In step 76*b*, the chip IC3 outputs the voltage V3 with the power-down level, wherein the voltage V3 falls from 3.3V to 0V. After step 76*b* is completed, proceed to step 77*b* to determine whether the slope of the falling edge Vf' of the power VDD is too large, e.g., it is determined that a ratio of (a difference calculated by subtracting the level P1*b* from the level P1*c*) divided by (a difference between moments t5*b* and t5*a*) greater than a ratio of (a difference calculated by subtracting the level P1*b* from the level P1*c*) divided by a value T; e.g., the value T is equal to a difference between moments t6 and t5, a difference between moments t7 and t6, or a difference between moments t8 and t7; if the determination is positive (YES), it means that the voltage of the power VDD drops rapidly, and proceed to step 78*b*; if the determination is negative (NO), it means The voltage of the power VDD drops slowly, and proceed to step 79*b*. In step 78*b*, the signal OD5 is changed from the enable level to the disable level (marked as "L"), and then proceed to step 7*ab*. In step 7*ab*, the chip IC2 outputs the voltage V2 with a power-down level, wherein the voltage V2 falls from 1.8V to 0V. In step 79*b*, it is delayed until moment t7 reaches to output the signal OD2 with the disable level (marked as "L"), and then proceed to step 7*ab*. In step 7*ab*, the chip IC2 outputs the voltage V2 with the power-down level, wherein the voltage V2 falls from 1.8V to 0V. After step 7*ab* is completed, proceed to step 7*bb* to determine whether the slope of the falling edge Vf' of the power VDD is too large, e.g., it is determined that a ratio of (a difference calculated by subtracting the level P1*a* from the level P1*b*) divided by (a difference between moments t5*c* and t5*b*) greater than a ratio of (a difference calculated by subtracting the level P1*a* from the level P1*b*) divided by a value T; e.g., the value T is equal to a difference between moments t6 and t5, a difference between moments t7 and t6, or a difference between moments t8 and t7; if the determination is positive (YES), it means that the voltage of the power VDD drops rapidly, and proceed to step 7*cb*; if the determination is negative (NO), it means the voltage of the power VDD drops slowly, and proceed to step 7*db*. In step 7*cb*, the signal OD4 is changed from the enable level to the disable level (marked as "L"), then proceed to step 7*eb*, the chip IC1 outputs the voltage V1 with the power-down level, wherein the voltage V1 drops from 1.1V to 0V. Before the power VDD drops to the level P2 of the minimum operation voltage of the controlled chip (taking t6*a* as an example), the voltages V1, V2, and V3 associated with the controller 131 are changed to the power-down level. In step 7*db*, it is delayed until moment t8 reaches to output the signal OD1 with the disable level (marked as "L"), then proceed to step 7*eb*. In step 7*eb*, the chip IC1 outputs the voltage V1 with the power-down level, wherein the voltage V1 is 1.1V drops to 0V. In the present disclosure, each of the DC power voltage, the primary enable signal, the auxiliary enable signal, and the control voltage has bi-stable levels (H/L).

In this way, a power timing control operation can be performed under light and heavy load conditions. Especially under heavy load, a voltage associated with the controller is changed to the power-down level before the power drops to the minimum operation voltage of the controlled chip. Thus, it can effectively prevent the controller from abnormality or breakdown.

Correspondingly, the present disclosure also provides a power timing control method, which can be applied to the above circuit (e.g., the circuit example 50 in FIG. 5). For example, the method is executed by a processor. For example, the circuit is electrically connected to an application-specific integrated circuit that includes a processor and a memory. The processor is coupled to the memory that stores at least one instruction. When the processor executes the instruction, at least part of the power timing control method is performed. The circuit includes a power supply part 11, including a DC converter 111, a primary chip (such as IC0), one or more auxiliary chips (such as IC4, IC5, and/or IC6), and one or more controlled chips (such as IC1, IC2, and/or IC3), a DC converter (i.e., a power conversion unit, such as a Flyback DC/DC converter) 111, in which an input terminal Vin and an output terminal Vo of the DC converter 111 are connected to the ground through the capacitors C1 and C2, respectively. Each of the one or more controlled chips is coupled to the primary chip and a respective one of the one or more auxiliary chips. As shown in FIGS. 5, 6, 7A, and 7B, the method includes: converting, by the DC converter 111, the DC power from a power supply system W into a DC power voltage (such as VDD), enabling the primary chip to generate at least one primary enable signal according to the DC power voltage; enabling each of the one or more auxiliary chips to generate an auxiliary enable signal based on the DC power voltage; and controlling each of the one or more controlled chips based on a logical-AND-gated operation of the primary enable signal (such as OD1, OD2, and/or OD3) and the auxiliary enable signal (such as OD4, OD5, and/or OD6) to generate a control voltage based on the DC power voltage. In the signal timing sequence, a representative moment during the control voltage falling from high to low level occurs earlier than equal to the minimum operation voltage level of the controlled chip in the signal waveform earlier than a moment (e.g., t6*a*) when a level on a signal waveform of the DC power voltage falling from high to low level equals a minimum operation voltage level (e.g., P2) for the controlled chip to facilitate in powering down the system normally. In the signal timing sequence, a representative moment during the control voltage rising from low to high level occurs later than a moment (e.g., t1) when a level on a signal waveform of the DC power voltage rising from low to high level equals a system power up-and-down voltage setting level (e.g., P1) to facilitate in powering up of the system normally. For specific implementation solutions of the method embodiments, reference may be made to the above device embodiments, which will not be described again.

Figure 8:
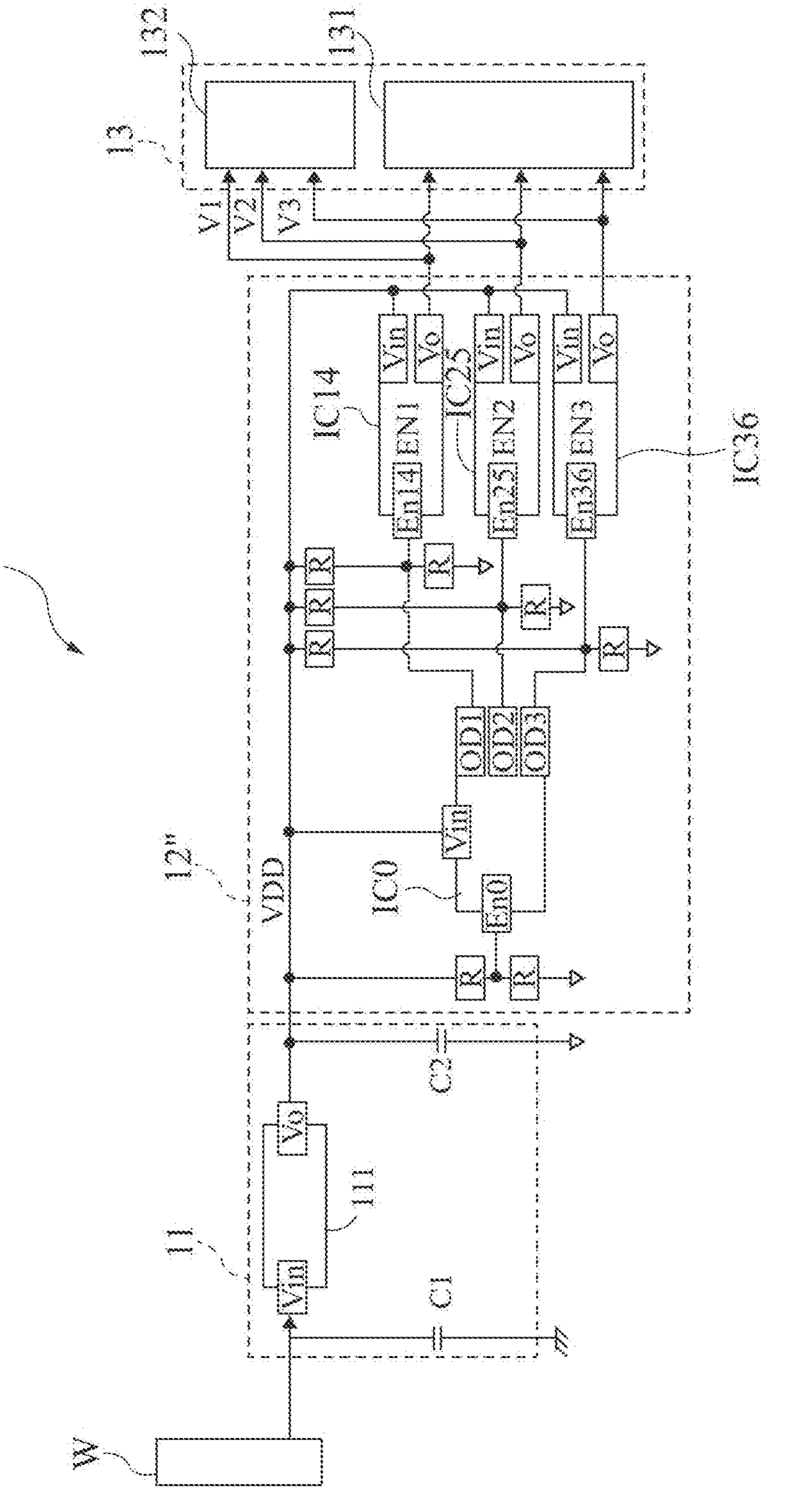
FIG. 8 is a schematic diagram illustrating a circuit of a second embodiment of the power timing control device provided in the present disclosure.
Figure 9:
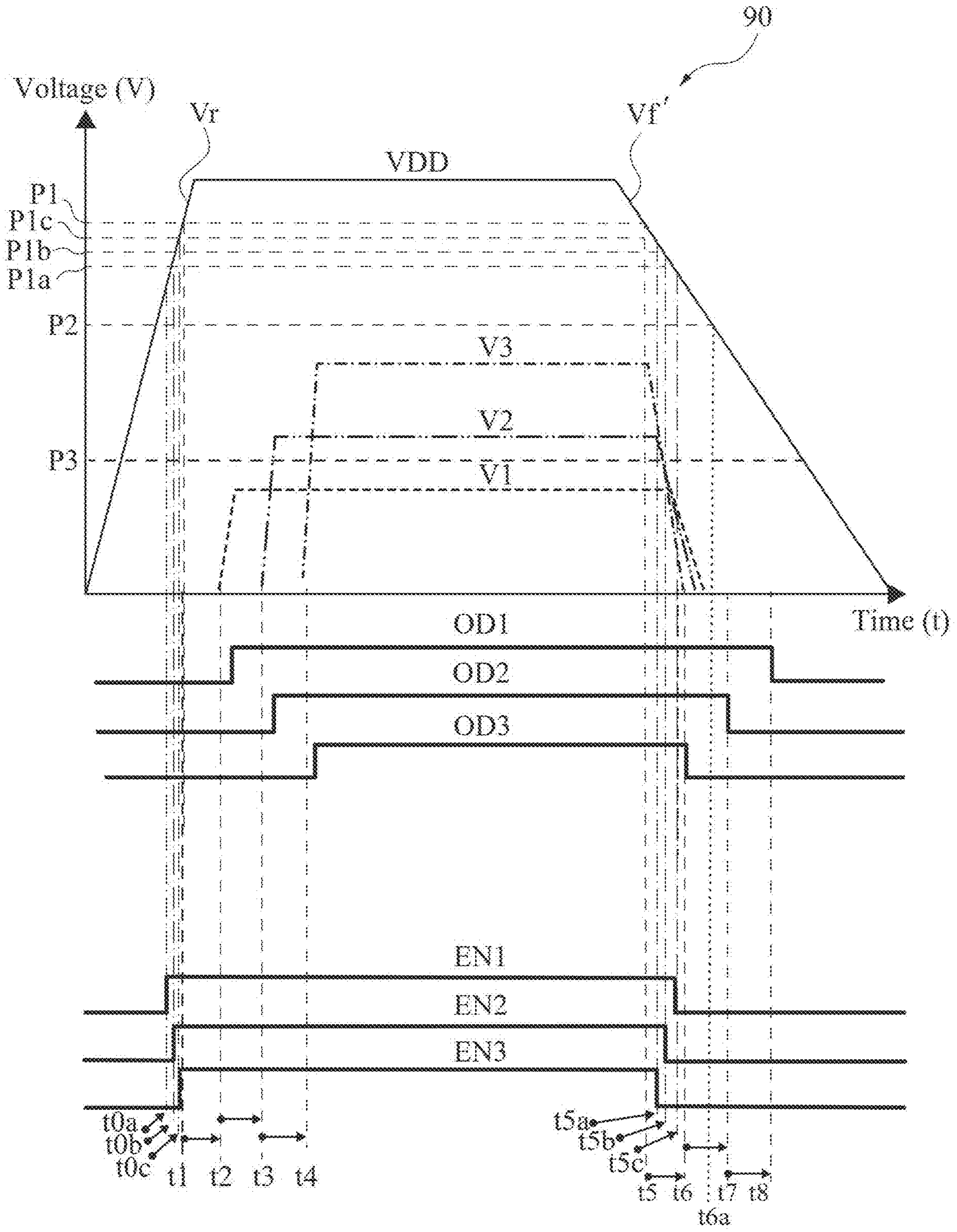
FIG. 9 is a schematic diagram illustrating a signal waveform for the circuit shown in FIG. 8 in a heavy-load state.

In another aspect, as shown in FIGS. 8 and 9, the present disclosure also provides a power timing control device, including a power supply part 11, for example, a DC converter (i.e., a power conversion unit, such as a Flyback DC/DC converter) 111, in which an input terminal Vin and an output terminal Vo of the DC converter 111 are connected to the ground through the capacitors C1 and C2, respectively, to convert the DC power from a power supply system W into a DC power voltage (such as VDD). The power timing control device includes a primary chip (such as IC0), which is configured to generate at least one primary enable signal (such as OD1, OD2, and/or OD3) based on the DC power voltage (such as VDD). The power timing control device includes one or more controlled chips (such as IC14, IC25, and/or IC36). Each of the one or more controlled chips has an auxiliary circuit and a controlled circuit inside. The auxiliary circuit is configured to generate an auxiliary enable signal based on the DC power voltage. The controlled circuit is configured to be enabled based on a logical-AND-gated operation of the primary and auxiliary enable signals to generate a control voltage (such as V1, V2, and/or V3) based on the DC power voltage. In a signal timing sequence, a representative moment during the control voltage falling from high to low level occurs earlier than a moment (e.g., t6*a*) when a level on a signal waveform of the DC power voltage falling from high to low level equals a minimum operation voltage level (e.g., P2) for the controlled chip to facilitate in powering down the system normally. In the signal timing sequence, a representative moment during the control voltage rising from low to high level occurs later than a moment (e.g., t1) when a level on a signal waveform of the DC power voltage rising from low to high level equals a system power up-and-down voltage setting level (e.g., P1) to facilitate in powering up of the system normally.

For example, a second embodiment uses logic embedded in the chip (including control logic in additional chips in the first embodiment) to perform a precise timing control process. As shown in FIG. 8, a circuit example 80 includes a power supply part 11, an electric control unit 12", and a power consumption part 13. The electric control part 12" is electrically connected to the power supply part 11 and the power consumption part 13. The power supply part 11 and the power consumption part 13 of the circuit example 80 are the same as the power supply part 11 and the power consumption part 13 of the circuit example 50 shown in FIG. 5 (or the circuit example 10 shown in FIG. 1). For example, the power supply part 11 includes a DC converter (such as a Flyback DC/DC converter) 111, which will not be described again. A difference between the circuit example 80 and the circuit example 50 is that the electric control part 12" of the circuit example 80 differs from the electric control part 12' of the circuit example 50.

As shown in FIG. 8, the electric control part 12" of the circuit example 80 includes a chip in a first type (e.g., serving as a primary chip) IC0 and three chips in a fourth type (e.g., serving as controlled chips) IC14, IC25, and IC36. An input terminal Vin of the chip IC0 and three input terminals Vin of the chips IC14, IC25, and IC36 input the power VDD. The power VDD can also form an enable voltage through a voltage divider (e.g., two resistors R connected in series) and transmit it to the enable terminal En0 of the chip IC0, such that three output terminals (such as drain output terminals) of the chip IC0 output signals OD1, OD2, and OD3 (i.e., the primary enable signals), respectively. The internal logic of the chip IC14 integrates the chip IC1 of the circuit example 50 (i.e., the controlled circuit) and the internal logic of the chip IC4 (i.e., the auxiliary circuit), the internal logic of chip IC25 integrates the internal logic of the chip IC2 (i.e., the controlled circuit) and the chip IC5 (i.e., the auxiliary circuit) of circuit example 50, and the internal logic of chip IC36 integrates the internal logic of chip IC3 (i.e., the controlled circuit) and the internal logic of the chip IC6 (i.e., the auxiliary circuit) of circuit example 50. Namely, the internal logic of the chip IC14, the chip IC25, and the chip IC36 imply the signals OD4, OD5, and OD6 of circuit example 50, respectively. Each enable terminals En14, En25, and En36 of the chips IC14, IC25, and IC36 are connected to respective one of three output terminals of the chip IC0, connected to the output terminal Vo of the DC converter 111 via a resistor R, and connected to the ground via another resistor R. Based on the voltage associated with the power VDD, the signal OD1 output by the output terminal of the chip IC0 and the built-in circuit (implying the signal OD4) associated with the enable terminal En14 of the chip IC14 collaboratively generate the signal EN1 that is used to drive the chip IC14 to generates the voltage V1 at the output terminal Vo. The signal OD2 output by the output terminal of the chip IC0 and the built-in circuit (implying the signal OD5) associated with the enable terminal En25 of the chip IC25 collaboratively generate the signal EN2 that is used to drive the chip IC25 to generate the voltage V2 at the output terminal Vo. The signal OD3 output by the output terminal of the chip IC0 and the built-in circuit (implying the signal OD6) associated with the enable terminal En36 of the chip IC36 collaboratively generate the signal EN3 that is used to drive the chip IC36 to generate the voltage V3 at the output terminal Vo.

As shown in FIGS. 8 and 9, the power supply part 11 generates the power VDD with an appropriate voltage (e.g., 5V). For example, the power VDD forms a rising edge Vr and a falling edge Vf' during the power-up and power-down phases. The rising edge Vr changes from a low level to a high level during the rising period. The falling edge Vf' falls from the high level to the low level during the falling period. There are three levels P1, P2, and P3, from high to low, between the low level and the high level. The first level P1 is a level for system power up-down voltage, the second level P2 is a level for minimum operation voltage for the three chips IC14, IC25, and IC36, and the third level P3 is a level for minimum operation voltage of the chip IC0. In addition, there are three intermediate levels P1*a*, P1*b*, and P1*c*, from low to high, between the two levels P1 and P2. It should be understood that in FIG. 9, the relative change relationship between signals at different levels is mainly presented for the convenience of explanation. Leveled voltage values are not necessarily accurately scaled and drawn in accurate proportions. The specific voltage value can be understood by those ordinarily skilled in the art to which the present disclosure belongs.

In the case that the system is light-loaded, as shown in FIGS. 5 and 8, after the voltages V1, V2, and V3 of the circuit example 80 are the same as the voltages V1, V2, and V3 of the circuit example 50, based on the power VDD, rise from the low level to the level for minimum operation voltage level (shown as P2 in FIGS. 2 and 6) of the three chips (e.g., IC1, IC2, and IC3 shown in FIG. 5, or IC14, IC25, and IC36 shown in FIG. 8), change to the power-up level and then change to the power-down level before the power VDD falls from the high level to the level for minimum operation voltage to make that the controller 131 operates normally.

As shown in FIGS. 8 and 9, when the system is in a heavy-load state (shown as a signal waveform 90), voltages V1, V2, and V3 are provided to the controller 131 and the peripheral circuit 132. Chips IC0, IC14, IC25, and IC36 can be appropriately configured to have control logic, as illustrated below.

In another aspect, as shown in FIGS. 8 and 9, during the rising edge Vr of the power VDD (such as the voltage signal waveform), at a moment t1, when the chip IC0 detects that the power VDD rises from the low level to the level P1, an appropriate time can be used for delaying to sequentially generate signals OD1, OD2, and OD3 with enable levels. At moment t0*a*, it is determined whether the level P1*a* reaches the power-up level of the chip IC14 to set the signal EN1 associated with the enable terminal En14 of the chip IC14 to the enable level (not shown in the figure), causing the chip IC14 to output the voltage V1 with the power-up level, wherein the voltage V1 rises from 0V to 1.1V. At moment t0*b*, it is determined whether the level P1*b* reaches the power-up level of the chip IC25 to set the signal EN2 associated with the enable terminal En25 of the chip IC25 to the enable level (not shown in the figure), causing the chip IC25 to output the voltage V2 with the power-up level, wherein the voltage V2 rises from 0V to 1.8V. At moment t0*c*, it is determined whether the level P1*c* reaches the power-up level of the chip IC36 to set the signal EN3 associated with the enable terminal En36 of the chip IC36 to the enable level (not shown in the figure), causing the chip IC36 to output the voltage V3 with the power-up level, wherein the voltage V3 rises from 0V to 3.3V.

In this way, during the rising edge Vr of the power VDD (such as the voltage signal waveform), the moments introduced between the level for minimum operation voltage (i.e., P2) of the controlled chip (i.e., IC14, IC25, and IC36) and the level of system power up-down voltage (i.e., P1) is used to more accurately generate the enable signals (i.e., EN1, EN2, and EN3) of the controlled chips (i.e., IC14, IC25, and IC36) to correctly generate voltages V1, V2, and V3 in sequence to the controller 131.

As shown in FIGS. 8 and 9, during the falling edge Vf' of the power VDD (such as the voltage signal waveform), at a moment t5, it is determined whether the level P1 reaches the power-up level of the chip IC0 to activate a power-down sequence control process and determine whether the slope of edge Vf' is too large. For example, it is determined whether a ratio of (a difference calculated by subtracting the level P1*c* from the level P1) divided by (a difference between moments t5*a* and t5) is greater than a ratio of (a difference calculated by subtracting the level P1*c* from the level P1) divided by a value T; e.g., the value T is equal to a difference between the moments t6 and t5, a difference between moments t7 and t6, or a difference between moments t8 and t7; if the determination is positive, it means that the voltage of the power VDD drops rapidly, and the chip IC36 outputs the voltage V3 with the power-down level, wherein the voltage V3 drops from 3.3V to 0V; if the determination is negative, it means that the voltage of the power VDD drops slowly, and it is delayed until a moment t6 reaches to output the signal OD3 with the disable level, such that the chip IC36 outputs the voltage V3 with the power-down level. Then, it is further determined whether the slope of the falling edge Vf' of the power VDD is too large. For example, it is determined whether a ratio of (a difference calculated by subtracting the level P1*b* from the level P1*c*) divided by (a difference between moments t5*b* and t5*a*) is greater than a ratio of (a difference calculated by subtracting the level P1*b* from the level P1*c*) divided by a value T; e.g., the value T is equal to a difference between moments t6 and t5, a difference between moments t7 and t6, or a difference between moments t8 and t7; if the determination is positive, it means that the voltage of power VDD drops rapidly, and the chip IC25 outputs the voltage V2 with the power-down level, wherein the voltage V2 drops from 1.8V to 0V; if the determination is negative, it means that the voltage of the power VDD drops slowly, and it is delayed until moment t7 reaches to output the signal OD2 with the disable level, such that the chip IC25 outputs the voltage V2 with the power-down level. Then, it is further determined whether the slope of the falling edge Vf' of the power VDD is too large. For example, it is determined whether a ratio of (a difference calculated by subtracting the level P1*a* from the level P1*b*) divided by (a difference between moments t5*c* and t5*b*) is greater than a ratio of (a difference calculated by subtracting the level P1*a* from the level P1*b*) divided by a value T; e.g., the value T is equal to a difference between moments t6 and t5, a difference between moments t7 and t6, or a difference between moments t8 and t7; if the determination is positive, it means that the voltage of the power VDD drops rapidly, and the chip IC14 outputs the voltage V1 with the power-down level, wherein the voltage V1 drops from 1.1V to 0V; if the determination is negative, it means that the voltage of the power VDD drops slowly, and it is delayed until moment t8 reaches to output the signal OD1 with the disable level, such that the chip IC14 outputs the voltage V1 with the power-down level. In this case, the DC power voltage, the primary enable signal, the auxiliary enable signal, and the control voltage has bi-stable levels (H/L).

In this way, a power timing control operation can be performed under both light and heavy load conditions. Especially under heavy load, a voltage associated with the controller is changed to the power-down level before the power drops to the minimum operation voltage of the controlled chip. Thus, it can effectively prevent the controller from abnormality or breakdown.

In summary, in the embodiments of the power timing control devices and methods of the present disclosure, each of the one or more controlled chips is enabled based on the logical-AND-gated operation of the primary enable signal and the auxiliary enable signal to generate the control voltage according to the DC power supply. In the signal timing sequence, the representative moment during the control voltage falling from high to low level occurs earlier than the moment when the level on the signal waveform of the DC power voltage falling from high to low level equals the level of minimum operation voltage for the controlled chip.

In this way, power timing control operations can be performed under both light and heavy load conditions. Especially under heavy load, interventions are provided in time before the power drops to the minimum operation voltage for the controlled chip, causing the voltage associated with the controller to change to a power-down level, which can effectively prevent the controller from abnormality or breakdown.

Although the present disclosure has been disclosed in the preferred embodiments, any person skilled in the art can make various changes and modifications without departing from the spirit and scope of the present disclosure. Therefore, the protection scope of the present disclosure shall be determined by the appended claims.

What is claimed is:

1. A power timing control device, comprising:

a power conversion unit configured to generate a DC power voltage;

a primary chip configured to generate at least one primary enable signal based on the DC power voltage;

one or more auxiliary chips, wherein each of the one or more auxiliary chips is configured to generate an auxiliary enable signal based on the DC power voltage; and one or more controlled chips, wherein each of the one or more controlled chips is coupled to the power conversion unit, a respective one of the one or more auxiliary chips, and the primary chip, and is configured to be enabled based on a logical-AND-gated operation of the primary enable signal and the auxiliary enable signal to generate a control voltage based on the DC power voltage;

wherein in a signal timing sequence, a representative moment during the control voltage falling from a high level to a low level occurs earlier than a moment when a level on a signal waveform of the DC power voltage falling from the high level to the low level equals a minimum operation voltage level for the controlled chip.

2. The power timing control device as claimed in claim 1, wherein in the signal timing sequence, a representative moment during the control voltage rising from the low level to the high level occurs later than a moment when another level on the signal waveform of the DC power voltage rising from the low level to the high level equals a system power up-and-down voltage setting level.

3. The power timing control device as claimed in claim 1, wherein the primary chip comprises at least one primary enable-output terminal, each of the one or more auxiliary chips comprises an auxiliary enable-output terminal, and each of the one or more controlled chips comprises an enable-input terminal, and wherein the enable-input terminal of each of the one or more controlled chips, the auxiliary enable-output terminal of a respective one of the one or more auxiliary chips, and a respective one of the at least one primary enable-output terminal are electrically connected to form a common contact that is electrically connected to the power conversion unit via a resistor to input the DC power voltage.

4. The power timing control device as claimed in claim 1, wherein the DC power voltage has a rising-edge signal waveform and a falling-edge signal waveform, which have a first level, a second level, and a plurality of intermediate levels, wherein the first level is a voltage setting level for system power-up and power-down, the second level is the minimum operation voltage level for the controlled chip, and the intermediate levels are between the first level and the second level, wherein a moment when the auxiliary enable signal changes its level is associated with a moment of a respective one of the intermediate levels.

5. The power timing control device as claimed in claim 1, wherein an enable signal is generated using the primary enable signal and the auxiliary enable signal according to a logical-AND-gated operation to control the control voltage output by respective one of the one or more controlled chips falling from the high level to the low level, and wherein a representative moment of the enable signal occurs earlier than the moment when the level on the signal waveform of the DC power voltage falling from the high level to the low level equals the minimum operation voltage level for the controlled chip.

6. The power timing control device as claimed in claim 1, wherein quantities of the control voltage, the primary enable signal, the auxiliary enable signal, the auxiliary chip, and the controlled chip are the same, wherein each of the quantities is plural, and wherein high levels of a plurality of control voltages are different from each other.

7. The power timing control device as claimed in claim 1, wherein each of the DC power voltage, the primary enable signal, the auxiliary enable signal, and the control voltage has bistable levels.

8. A power timing control device, comprising:
- a power conversion unit configured to generate a DC power voltage;
- a primary chip configured to generate at least one primary enable signal based on the DC power voltage; and
- one or more controlled chips, wherein each of the one or more controlled chips is coupled to the power conversion unit and the primary chip, and comprises:
- an auxiliary circuit configured to generate an auxiliary enable signal based on the DC power voltage; and
- a controlled circuit configured to be enabled based on a logical-AND-gated operation of the primary enable signal and the auxiliary enable signal to generate a control voltage based on the DC power voltage;
- wherein in a signal timing sequence, a representative moment during the control voltage falling from a high level to a low level occurs earlier than a moment when a level on a signal waveform of the DC power voltage falling from the high level to the low level equals a minimum operation voltage level for the controlled chip.

9. The power timing control device as claimed in claim 8, wherein in the signal timing sequence, a representative moment during the control voltage rising from the low level to the high level occurs later than a moment when another level on the signal waveform of the DC power voltage rising from the low level to the high level equals a system power up-and-down voltage setting level.

10. The power timing control device as claimed in claim 8, wherein the primary chip comprises at least one primary enable-output terminal, and each of the one or more controlled chips comprises an enable-input terminal, and wherein the enable-input terminal of each of the one or more controlled chips and a respective one of the at least one primary enable-output terminal are electrically connected to form a common contact that is electrically connected to the power conversion unit via a resistor to input the DC power voltage.

11. The power timing control device as claimed in claim 8, wherein the DC power voltage has rising-edge and falling-edge signal waveforms having a first level, a second level, and a plurality of intermediate levels, wherein the first level is a voltage setting level for system power-up and power-down, the second level is the minimum operation voltage level for the controlled chip, and the intermediate levels are between the first level and the second level, wherein a moment when the auxiliary enable signal changes its level is associated with a moment of a respective one of the intermediate levels.

12. The power timing control device as claimed in claim 8, wherein an enable signal is generated using the primary enable signal and the auxiliary enable signal according to a logical-AND-gated operation to control the control voltage output by respective one of the one or more controlled chips falling from the high level to the low level, and wherein a representative moment of the enable signal occurs earlier than the moment when the level on the signal waveform of the DC power voltage falling from the high level to the low level equals the minimum operation voltage level for the controlled chip.

13. The power timing control device as claimed in claim 8, wherein quantities of the control voltage, the primary enable signal, the auxiliary enable signal, the controlled chip, the auxiliary circuit, and the controlled circuit are the same, wherein each of the quantities is plural, and wherein high levels of a plurality of control voltages are different from each other.

14. The power timing control device as claimed in claim 8, wherein each of the DC power voltage, the primary enable signal, the auxiliary enable signal, and the control voltage has bistable levels.

15. A power timing control method, applied to a circuit comprising a power conversion unit, a primary chip, one or more auxiliary chips, and one or more controlled chips, wherein each of the one or more controlled chips is coupled to the power conversion unit, a respective one of the one or more auxiliary chips, and the primary chip, and the method comprises:
- enabling the power conversion unit to generate a DC power voltage;
- enabling the primary chip to generate at least one primary enable signal based on the DC power voltage;
- enabling each of the one or more auxiliary chips to generate an auxiliary enable signal based on the DC power voltage; and
- controlling each of the one or more controlled chips to be enabled based on a logical-AND-gated operation of the primary enable signal and the auxiliary enable signal to generate a control voltage based on the DC power voltage;

wherein in a signal timing sequence, a representative moment during the control voltage falling from a high level to a low level occurs earlier than a moment when a level on a signal waveform of the DC power voltage falling from the high level to the low level equals a minimum operation voltage level for the controlled chip.

16. The power timing control method as claimed in claim 15, wherein in the signal timing sequence, a representative moment during the control voltage rising from the low level to the high level occurs later than a moment when another level on the signal waveform of the DC power voltage rising from the low level to the high level equals a system power up-and-down voltage setting level.

17. The power timing control method as claimed in claim 15, wherein the DC power voltage has rising-edge and falling-edge signal waveforms having a first level, a second level, and a plurality of intermediate levels, wherein the first level is a voltage setting level for system power-up and power-down, the second level is the minimum operation voltage level for the controlled chip, and the intermediate levels are between the first level and the second level, wherein a moment when the auxiliary enable signal changes its level is associated with a moment of a respective one of the intermediate levels.

18. The power timing control method as claimed in claim 15, wherein an enable signal is generated using the primary enable signal and the auxiliary enable signal according to a logical-AND-gated operation to control the control voltage output by respective one of the one or more controlled chips falling from the high level to the low level, and wherein a representative moment of the enable signal occurs earlier than the moment when the level on the signal waveform of the DC power voltage falling from the high level to the low level equals the minimum operation voltage level for the controlled chip.

19. The power timing control method as claimed in claim 15, wherein quantities of the control voltage, the primary enable signal, the auxiliary enable signal, the auxiliary chip, and the controlled chip are the same, wherein each of the quantities is plural, and wherein high levels of a plurality of control voltages are different from each other.

20. The power timing control method as claimed in claim 15, wherein each of the DC power voltage, the primary enable signal, the auxiliary enable signal, and the control voltage has bistable levels.

* * * * *